United States Patent [19]  [11] Patent Number: 4,920,470
Clements  [45] Date of Patent: Apr. 24, 1990

[54] VOLTAGE INVERTER

[75] Inventor: Philip E. Clements, Littleton, Colo.

[73] Assignee: Zirco, Inc., Wheat Ridge, Colo.

[21] Appl. No.: 352,860

[22] Filed: May 17, 1989

[51] Int. Cl.⁵ .......................................... H02M 3/335
[52] U.S. Cl. ..................................... 363/21; 363/132; 323/266
[58] Field of Search ................... 323/266, 282; 363/21, 363/37, 89, 98, 124, 132

[56]  References Cited

U.S. PATENT DOCUMENTS

| 4,410,926 | 10/1983 | Hafner et al. | 363/89 |
| 4,533,986 | 8/1985 | Jones | 323/266 |
| 4,706,177 | 11/1987 | Josephson | 363/98 |
| 4,761,722 | 8/1988 | Pruitt | 363/124 |

OTHER PUBLICATIONS

Harada; "Phase-Controlled DC/AC Converter with High-Frequency Switching"; IEEE, vol. 3, No. 4, 10/88.

Primary Examiner—Patrick R. Salce
Assistant Examiner—Jeffrey Sterrett
Attorney, Agent, or Firm—Rosen, Dainow & Jacobs

[57]  ABSTRACT

An inverter circuit includes a transformer having a primary winding with a first end adapted to be connected to a d.c. source, a switch connecting the other end of the primary winding to a reference potential, a secondary winding coupled to the primary winding, a rectifier for rectifying the output of the secondary winding, and a bridge switch circuit connected to invert the rectified secondary winding voltage to produce an a.c. output voltage. The inverter circuit further includes a first control circuit for producing a first pulse train of pulses having a first given frequency and a pulse width responsive to the rectified output voltage of the secondary winding, and a circuit for applying the pulse train to the switch for controlling the switch to open and close at the given frequency. The inverter circuit further includes a second control circuit for producing a second pulse train or pulses of a second given frequency and constant pulse width, and a control arrangement for controlling the bridge switch circuit with the second pulse train of pulses.

8 Claims, 3 Drawing Sheets

VOLTAGE INVERTER

BACKGROUND OF THE INVENTION

The invention relates to voltage inverters, and is specifically directed to the provision of a voltage inverter adapted to convert d.c. current of a vehicle or the like, to a.c. current of a frequency and voltage adaptable for energizing conventional appliances or equipment without any equipment modifications. It will be of course apparent that the invention is not limited to this specific application.

D.c. to a.c. inverters are conventionally employed, for example, in recreational vehicles, to provide power for conventional appliances. Such devices are also employed in automobiles, energized for example from a cigarette lighter, for operating various a.c. equipment.

In the past, solid state circuits have been provided for converting direct voltages to alternating voltages. ("Phase-controlled DC-AC Converter with High Frequency Switching, K. Harada et al., IEEE Transactions on Power Electronics, Vol. 3, No. 4, Oct., 1988, pp 406–411; and "Selecting Inverters", D. Shah, Power Technics Magazine, Feb, 1989, pp 40–44). Such devices, however conventionally employ discrete electronic components.

SUMMARY OF THE INVENTION

The invention is directed to the provision of an improved economical and compact solid state inverter.

Briefly stated, in accordance with the invention, an inverter comprises a high frequency transformer having a primary winding with a first end adapted to be connected to a d.c. source, switch connecting the other end of the primary winding to a reference potential, a secondary winding coupled to the primary winding, a rectifier for rectifying the output of the secondary winding, and a bridge switch circuit connected to invert the rectified secondary winding voltage to produce an a.c. output voltage. The inverter circuit further includes a first control circuit for producing a first pulse train of pulses having a first given frequency and a pulse width responsive to the rectified output voltage of the secondary winding, and a circuit for applying the pulse train to the switch for controlling the switch to open and close at the given frequency. The inverter circuit further includes a second control circuit for producing a second pulse train of pulses of a second given frequency and constant pulse width, and a control arrangement for controlling the bridge switch circuit with the second pulse train of pulses.

Advantageously, in accordance with the invention, the various switches are power MOSFET and the control circuits are integrated circuit, such as, for example, type TL494 pulse width modulation circuits. It will be understood, of course, that the invention is not limited to the use of these specific devices.

BRIEF DESCRIPTION OF THE DRAWING

In order that the invention may be more clearly understood, it will not be disclosed in greater detail with reference to the accompanying drawing, wherein.

DETAILED DISCLOSURE PREFERRED EMBODIMENT OF THE INVENTION

Figure 1:
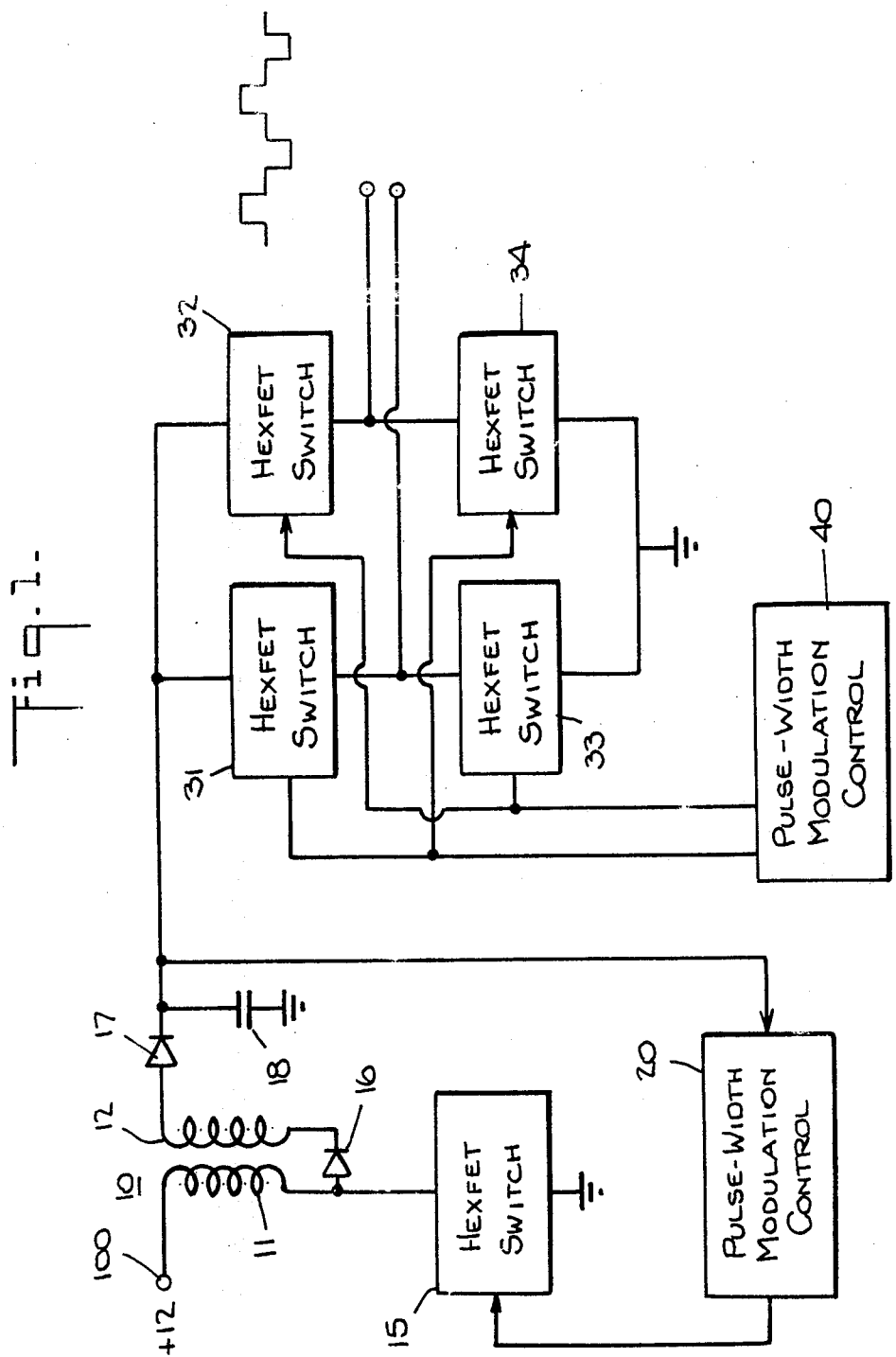
FIG. 1 is a simplified block diagram of the system of the invention.

Referring now to FIG. 1, the inverter in accordance with the invention includes a high frequency transformer 10 having a primary winding 11 adapted to be connected to a source of D.C. voltage, such as a 12 volt source, and a secondary winding 12. A switch, such as Hexfet power MOSFET switch 15 is connected in series with the primary winding, conduction through the power MOSFET switch 15 being controlled by a pulse width modulation control circuit 15. The switch 20 is preferably connected to the transformer via a short lead. In order to enable the desired efficiency of the inverter, the switching time of the switch 15 must be less than 80 nanoseconds. The D.C. resistance of this switch must be less than 0.03 ohms, in order to prevent $I^2R$ power loss. The reduction in power loss provides increased efficiency and the generation of less heat. A rectifier 16 is connected between the switched end of the primary winding 11 and the lower end of the secondary winding 12 in order to raise the d.c. level of the secondary winding, for example by about 30 volts.

The output of the secondary winding is rectified by rectifier 17 and filtered by a capacitor 18. This output, which may be about 150 volts in the described embodiment of the invention, is applied to the control circuit 20 for pulse width control of the power MOSFET switch 15, in order to regulate the output voltage of the rectifier 16. The regulation circuit 20 will be described in greater detail with reference to FIG. 2.

Referring still to FIG. 1, the high voltage output of the rectifier 16 is also applied to a switching bridge 30, preferably comprised of four Hexfet power MOSFET switches 31, 32, 33 and 34, to produce a simulated sine wave output voltage. The switches 31-34 are controlled by a pulse width modulation control circuit 40. This control will be disclosed in greater detail with reference to FIG. 3.

Figure 2:
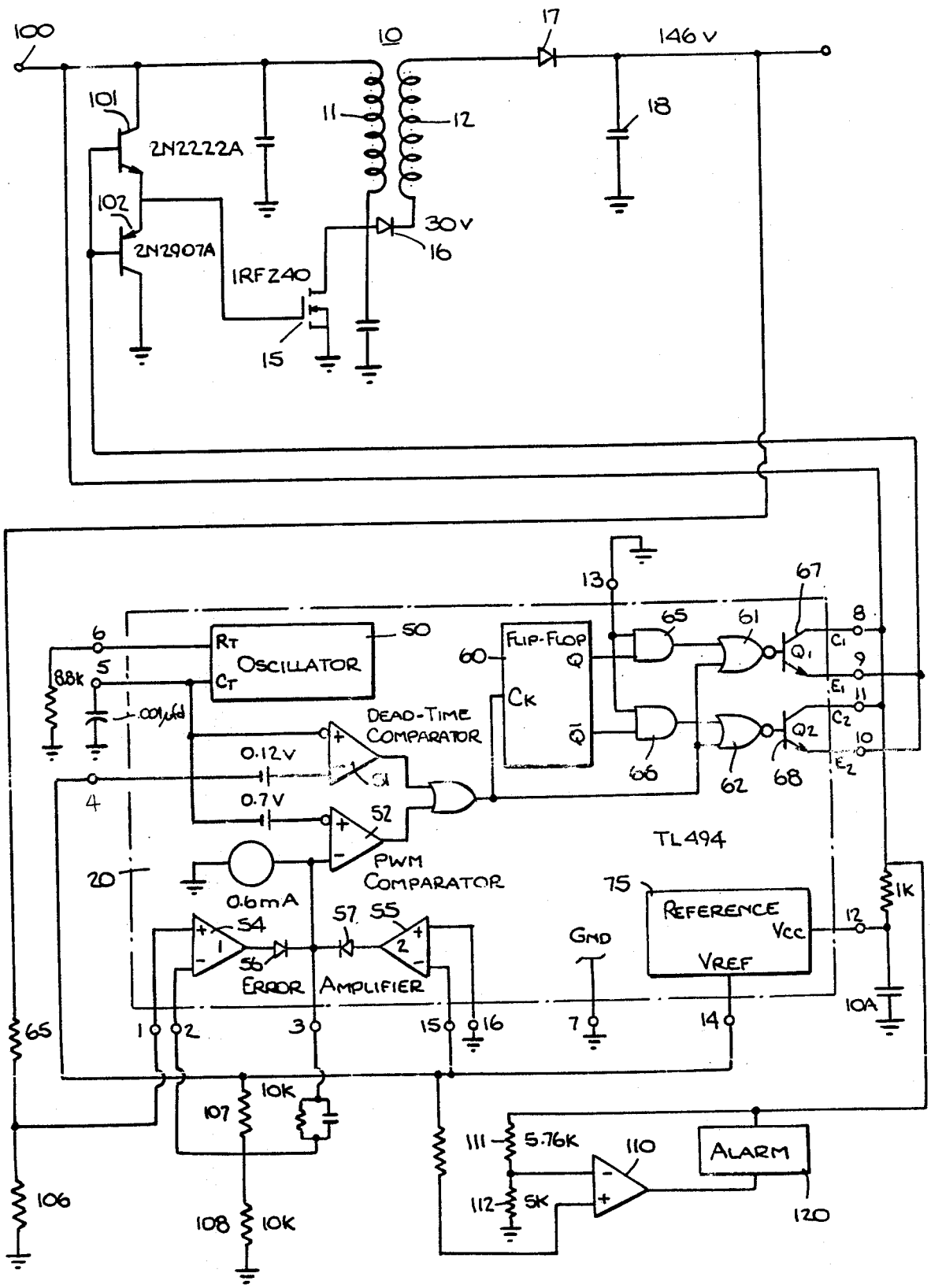
FIG. 2 is a detailed circuit diagram of the input section of the system of FIG. 1.
Figure 3:
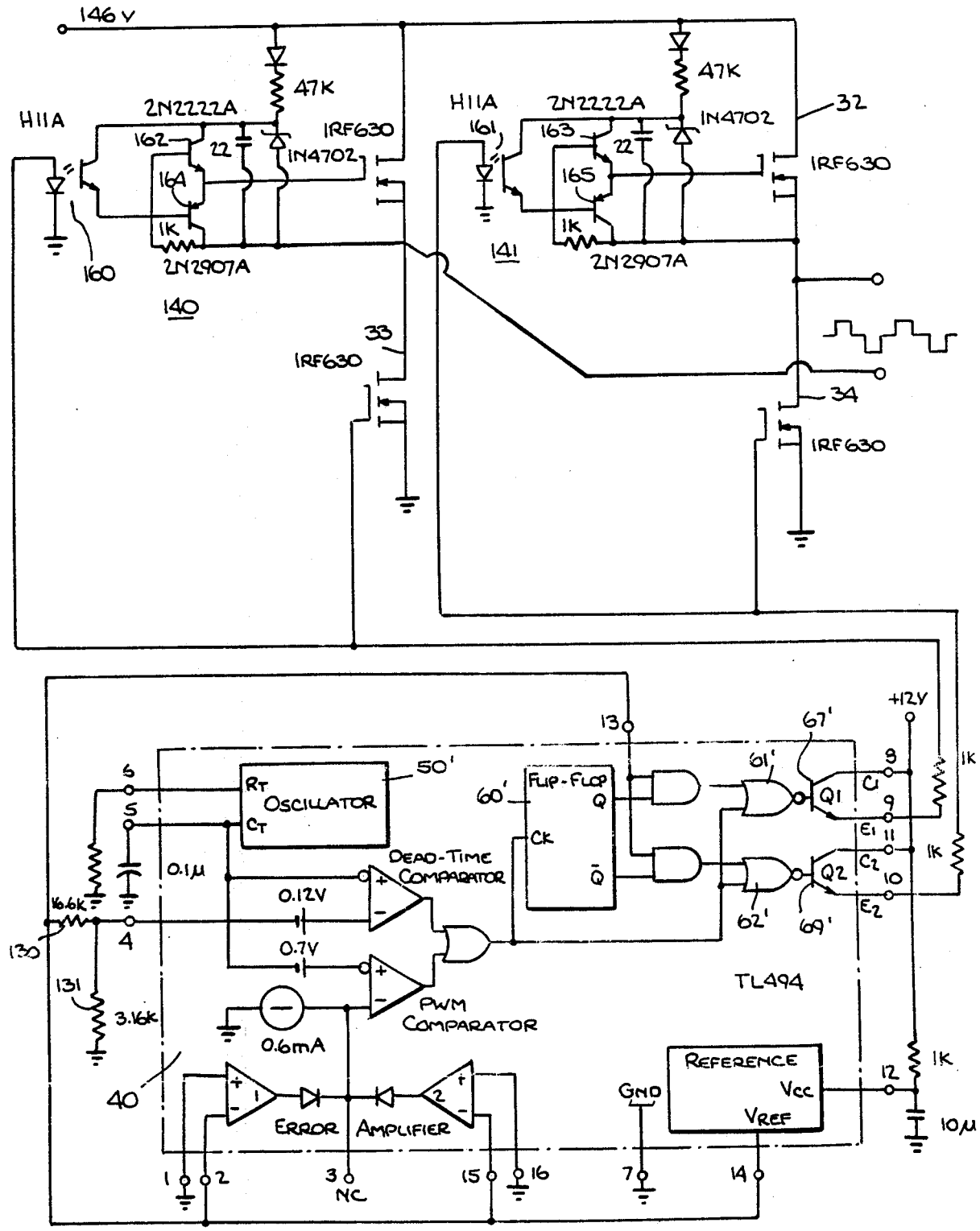
FIG. 3 is a detailed circuit diagram of the output section of the system of FIG. 1, adapted to be directly connected to the output of the circuit of FIG. 2.

The pulse width modulation control circuits 20 and 40, as illustrated in FIGS. 2 and 3, may each be comprised for example of a TL494 control circuit manufactured by Motorola, Inc. This circuit will be briefly described before a detailed description of the circuit of the invention, in order to enable a clearer understanding of the invention.

The control circuits 20, 40 include a sawtooth oscillator 50 having an externally set frequency. Specifically, the frequency of the oscillator is substantially:

$$\frac{1.1}{R \times C}$$

where R is the resistance of a resistor connected between terminal 6 and ground reference, and C is the capacitance of a capacitor connected between terminal 5 and ground reference.

The output of the sawtooth oscillator, taken across the capacitor connected to the terminal 5, is applied as one input to the dead time comparators 51 and the pulse width modulation comparator 52 (via a 0.7 volt offset source). The other input to the dead time comparator 51 is obtained from the dead time control input terminal 4. The other input of the of the pulse width modulation comparator 52 is obtained either from the terminal 3, or the OR'ed outputs of the error amplifiers 54, 55 (via diodes 56, 57). The outputs of the comparators 51, 52 are applied, via OR gate 59, to the clock terminal of the flip flop 60, as well as to one input of each of the NOR gates 61, 62. A low-to-high clock pulse is thus input to the flip flop 60 at each negative going flank of the output of the sawtooth oscillator, so that the flip flop is clocked at the rate of the oscillator. The output of the OR gate 59, applied to the OR gates 61, 62, goes low when the instantaneous sawtooth voltage, as applied to the comparators, is greater than the voltages at the other inputs of both of the comparators, of course taking into consideration the offset biases applied to these comparators.

The outputs of the flip flop 60 are applied to AND gates 65, 66, so that when the other inputs of these AND gates, from the output mode terminal 13, is high, the outputs of these AND gates alternately apply high and low level voltage to the inputs of the OR gates 61, 62. When the voltage applied to the terminal 13 is low, the outputs of the AND gates 65, 66 are both continually low, so that the OR gates 61, 62 pass the same pulse width modulated signals, and hence the output transistors 67, 6B are conductive at the same time.

The control circuit 20, 40 further includes a reference source 75 for producing a 5 volt reference voltage at terminal 14. The circuit also includes Schmidt triggers (not illustrated) for maintaining a continuous high output from the OR gate 59 when the supply voltage and reference voltage fall below predetermined levels.

Referring still to FIG. 2, the input terminal 100, adapted to be connected to a 12 volt source, such as to a cigarette lighter plug of a car, is connected to one end of the primary winding 11. The other end of the primary winding is grounded via the power MOSFET switch 15, which may be type IRFZ40. NPN transistor 101 and PNP transistor 102 are connected in series between the terminal 100 and ground and their junction is connected to the gate of the power MOSFET switch 15. The bases of these transistors are connected together, and to the output terminals 9 and 10 of the control circuit 20. As discussed above, the diode 16 is connected between the lower ends of the primary and secondary windings, and since the power MOSFET switch develops a voltage of about 30 volts at the lower end of the primary winding, this voltage is applied to the lower end of the secondary winding to increase the output voltage.

The transformer 10 is a high frequency transformer having a ferrite core, having, as an example, a primary winding of 5 turns and a secondary winding of 55 turns, and is connected in a fly back configuration.

A resistor of 8.8k is connected to the terminal 6 of the control circuit 20, and a capacitor of 0.001 mfd is connected to the terminal 5, so that the frequency of the sawtooth oscillator is about 125 kHz. Since the terminal 13 is connected to ground, the AND gates 65 and 66 are continually blocked, and the OR gates 61 and 62 will effect period conduction in the transistors 67, 68 at the same time, at the clock rate of 125 kHz. This output controls the transistors 101, 102, to periodically ground the lower end of the primary winding, thereby to induce a voltage in the secondary winding. This voltage is rectified by the rectifier 17 to produce a direct high voltage of, for example only, 150 volts.

Since the terminal 4 of the control circuit 20 is connected to the 5 volt reference terminal, the duty cycle of the output of the control circuit is very low. A voltage divider comprised of resistors 105, 106 applies a portion of the high voltage d.c. output to the terminal 1 of the control circuit, i.e. to the error amplifier 54. A voltage divider comprised of resistors 107, 108 applies a portion of the 5 volt reference from terminal 14 to the terminal 2, i.e. the other input of the error amplifier 54. This amplifier thus applies a voltage responsive to variation in the high voltage d.c. output to the pulse width modulation comparator 52, to thereby modulate the pulse width of the output of the control circuit 20 as a function of the output voltage. As a consequence, the control circuit maintains the high d.c. output voltage substantially constant. In this circuit the error amplifier 55 a nd the control input 3 do not serve any control functions.

The 5 volt reference is also applied as one input of a comparator 110, the other input thereof being derived from the 12 volt input voltage via a voltage divider 111, 112. The output of the comparator is applied to an alarm device 120, such as for example, a buzzer. The resistors of the potentiometer 111, 112 are selected so that the alarm is given when the input voltage falls below a given value, such as for example 10.6 volts.

The high d.c. output voltage is applied to the circuit of FIG. 3. In this circuit, the resistor and capacitor connected to the terminals 6 and 5 of the control circuit 40 are selected to provide an oscillator frequency from the sawtooth oscillator 50' of 120 Hz. The terminal 13 is connected to the 5 volt reference terminal 14 to be high, so that the output of the flip flop 60' is active to alternately enable conduction of the output transistors 67', 68' at a 120 Hz rate, via the NOR gates 61', 62', thereby controlling the output frequency from the inverter circuit of the invention to be 60 Hz. In this circuit, the error amplifiers are not used, so that the pulse width of the output pulses is constant, and determined by the setting of the dead time. A voltage divider comprises of resistors 130, 131 is connected to the 5 volt reference terminal 14, with the junction thereof connected to the dead time control terminal 4. The resistors of this voltage divider are selected to that the output waveform from the inverter of the invention simulates a sine wave.

The high d.c. input to the circuit is applied to a bridge circuit comprises of power Mosfet switches 31, 32, 33 and 34. These switches may be of the type IRF630. In this bridge circuit, the switches 33 and 34 are controlled directly by the outputs from terminals 9 and 10 of the control circuit 40. The switches 31 and 32, however, are controlled from these control outputs via isolating circuits 140, 141, in order to be able to provide gate voltages for these switches that are within +or −20 volts of the source voltages. Each of these isolation circuits references the gate voltage to the load, and includes an optocoupler 160, 161 coupled to the bases of NPN transistors 162, 163 and PNP transistors 164, 165 connected in series therewith. The optocouplers permit the use of low voltage pulse width modulation control signals to control or switch the high voltage source. The junctions of these transistors are connected to the gates of the switches 31, 32 respectively. These isolation circuits are connected between the high d.c. input line and the respective output lines as illustrated in FIG. 3.

The inverter described with reference to FIGS. 2 and 3 has provided 120 volt outputs that vary no more than about 2.6% in voltage and + or − about 0.01% in frequency over a wide range of loads and engine r.p.m of the vehicle providing the d.c. current.

The voltage inverter of the invention employs self regulation, so that it does not require adjustments in either voltage or frequency. The combination of the use of pulse width modulated pulse trains and low impedance switches, with the transformer makes it possible for the inverter to use a small size transformer, leading to high efficiency of the system. This combination thus allows construction of the inverter with the use of a very small heat sink, such that a casing for the inverter may comprise the only heat sink. The high efficiency of the inverter also renders it possible to mount the inverter in a sealed case that does not have any vent holes, fans or cooling mechanisms other than natural air convection cooling surfaces. If a sealed case is used, a fuse for the circuit may be mounted eternally of the case.

The inverter in accordance with the invention also enables use of a vehicle to which the inverter is connected to be used as the a.c. ground.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. An inverter circuit comprising a transformer having a primary winding with a first end adapted to be connected to a d.c. source, a switch connecting the other end of said primary winding to a reference potential, a secondary winding coupled to said primary winding, means for rectifying the output of said secondary winding, and a bridge switch circuit connected to invert the rectified secondary winding voltage to produce an a.c output voltage, said inverter circuit further comprising a first control circuit for producing a first pulse train of pulses having a first given frequency and a pulse width responsive to the rectified output voltage of said secondary winding, and means for applying said pulse train to said switch for controlling said switch to open and close at said given frequency, said inverter circuit further comprising a second control circuit for producing a second pulse train of pulses of a second given frequency and constant pulse width, and means controlling said bridge switch circuit with said second pulse train of pulses.

2. The inverter circuit of claim 1 wherein said switch is a power Mosfet switch.

3. The inverter circuit of claim 1 wherein said bridge switch circuit is comprised of four power Mosfet switches connected in a bridge configuration.

4. The inverter circuit of claim 1 wherein said first control circuit comprises a sawtooth oscillator, an output switch means, and a gate circuit for producing gating pulses for controlling the conductive state of said output switch means at the frequency of said sawtooth oscillator to produce said first train of pulses, said gate circuit further comprising means for controlling the pulse width of said gating pulses in response to the rectified output of said secondary winding.

5. The inverter circuit of claim 1 wherein said second control circuit comprises a sawtooth oscillator, first and second switch means, and a gate circuit for producing gating pulses for controlling the conductive state of said first and second output switch means, said gate circuit comprising a flip flop, means for clocking said flip flop by the output of said sawtooth oscillator for alternately enabling said first and second switch means, and means for controlling separate pairs of the switches of said bridge switch circuit by said first and second output switch means.

6. The inverter circuit of claim 5 wherein said clocking means comprises means for controlling the conductive states of said first and second switch means to periodically inhibit conduction of either switch means, whereby the output of said bridge switch circuit is a square wave voltage simulating a sine wave.

7. The inverter circuit of claim 1 wherein said rectifying means comprises a first rectifier connected to one end of said secondary winding, said circuit further comprising a second rectifier connected between the other end of said secondary winding and the junction of said primary winding and switch, whereby the output voltage from said secondary winding is increased.

8. The inverter circuit of claim 1 wherein said means for controlling said bridge switch circuit comprises optocoupling means.

* * * * *